United States Patent
Hunt et al.

(10) Patent No.: US 11,749,142 B2
(45) Date of Patent: Sep. 5, 2023

(54) OPTICAL SEE-THROUGH VIEWING DEVICE AND METHOD FOR PROVIDING VIRTUAL CONTENT OVERLAPPING VISUAL OBJECTS

(71) Applicant: Telefonaktiebolaget LM Ericsson (publ), Stockholm (SE)

(72) Inventors: Alexander Hunt, Tygelsjö (SE); Saeed Bastani, Lund (SE); Andreas Kristensson, Södra Sandby (SE); Yun Li, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 54 days.

(21) Appl. No.: 17/299,014

(22) PCT Filed: Dec. 4, 2018

(86) PCT No.: PCT/EP2018/083523
§ 371 (c)(1),
(2) Date: Jun. 2, 2021

(87) PCT Pub. No.: WO2020/114582
PCT Pub. Date: Jun. 11, 2020

(65) Prior Publication Data
US 2022/0044602 A1 Feb. 10, 2022

(51) Int. Cl.
*G09G 3/00* (2006.01)
*G06T 7/80* (2017.01)
(Continued)

(52) U.S. Cl.
CPC ......... *G09G 3/003* (2013.01); *G02B 27/0101* (2013.01); *G06T 7/80* (2017.01);
(Continued)

(58) Field of Classification Search
CPC ...... G09G 3/003; G09G 5/02; G09G 2340/06; G09G 2354/00; G09G 5/026; G09G 5/14;
(Continued)

(56) References Cited

U.S. PATENT DOCUMENTS

| 5,825,340 A | 10/1998 | Torizuka et al. |
| 2012/0007839 A1 | 1/2012 | Tsao et al. |

(Continued)

FOREIGN PATENT DOCUMENTS

| CN | 106125930 A | 11/2016 |
| CN | 107623803 A | 1/2018 |

(Continued)

OTHER PUBLICATIONS

Itoh, Yuta, et al., "Interaction-Free Calibration for Optical See-Through Head-Mounted Displays based on 3D Eye Localization", IEEE Symposium on 3D User Interfaces, Minneapolis, Minnesota, Mar. 29-30, 2014, 1-8.

(Continued)

*Primary Examiner* — Wesner Sajous
(74) *Attorney, Agent, or Firm* — Murphy, Bilak & Homiller, PLLC

(57) ABSTRACT

An Optical See-Through viewing device (100) comprising a controller (101) configured to control a display arrangement (110) comprising an image capturing device (112), wherein the controller (101) is further configured to: a) display virtual content (DVC, 115) overlapping at least one real-life object (RLO) viewable by a user's eye (E) through the Optical See-Through viewing device (100); b) capture a composite view of displayed virtual content (DVC, 115) overlapping real life object (RLO); c) determine captured virtual content (CVC) based on composite view; d) determine a difference (D) between captured virtual content (CVC) and the displayed virtual content (DVC, 115); e)

(Continued)

determine modified virtual content (MDVC) based on the difference (D); and f) display the modified virtual content (MDVC).

20 Claims, 9 Drawing Sheets

(51) Int. Cl.
| | |
|---|---|
| G06T 7/90 | (2017.01) |
| G02B 27/01 | (2006.01) |
| G09G 5/02 | (2006.01) |
| G09G 5/10 | (2006.01) |
| G09G 5/14 | (2006.01) |

(52) U.S. Cl.
CPC ........ *G06T 7/90* (2017.01); *G02B 2027/0138* (2013.01); *G06T 2207/10024* (2013.01); *G09G 2340/06* (2013.01); *G09G 2354/00* (2013.01)

(58) Field of Classification Search
CPC ........ G09G 5/10; G09G 5/028; G09G 3/2003; G09G 5/34; G09G 5/377; G09G 5/38; G09G 2320/02; G09G 2320/04; G09G 2320/06; G09G 2320/0271; G09G 2320/0626; G09G 2320/0646; G09G 2320/066; G09G 2320/0666; G09G 2320/0693; G09G 2320/10; G09G 2340/10; G09G 2340/12; G06T 7/90; G06T 7/80; G06T 7/85; G06T 2207/10024; G06T 2007/10012; G02B 27/0101; G02B 2027/0138; G02B 2027/138; G02B 2027/0112; G02B 2027/0147
USPC ........................................................ 345/591
See application file for complete search history.

(56) References Cited

U.S. PATENT DOCUMENTS

| | | |
|---|---|---|
| 2013/0235191 A1 | 9/2013 | Miao et al. |
| 2014/0267667 A1 | 9/2014 | Ellsworth |
| 2014/0300632 A1 | 10/2014 | Laor |
| 2015/0279113 A1 | 10/2015 | Knorr et al. |
| 2016/0124230 A1 | 5/2016 | Hino et al. |
| 2016/0191887 A1 | 6/2016 | Casas |
| 2016/0225191 A1 | 8/2016 | Mullins |
| 2016/0240125 A1* | 8/2016 | Sridharan ............. G09G 5/026 |
| 2016/0267720 A1 | 9/2016 | Mandella et al. |
| 2017/0035293 A1 | 2/2017 | Nistico et al. |
| 2017/0039774 A1 | 2/2017 | Estable |
| 2018/0018791 A1 | 1/2018 | Guoyi |
| 2018/0019791 A1 | 1/2018 | Molev Shteiman et al. |
| 2018/0084232 A1 | 3/2018 | Belenkii et al. |
| 2019/0019308 A1 | 1/2019 | Iwata |
| 2019/0025588 A1* | 1/2019 | Osterhout ............. H04N 13/383 |
| 2019/0025589 A1* | 1/2019 | Haddick ................. G06F 3/013 |
| 2019/0025590 A1* | 1/2019 | Haddick ............. G02B 27/141 |
| 2019/0041642 A1 | 2/2019 | Haddick et al. |
| 2020/0201050 A1* | 6/2020 | Osterhout ............. H04N 13/239 |
| 2021/0347318 A1* | 11/2021 | Knutsen ................. B60R 19/48 |
| 2022/0091423 A1* | 3/2022 | Haddick ................. G06F 1/163 |
| 2022/0326528 A1* | 10/2022 | Haddick ................. G02B 5/32 |

FOREIGN PATENT DOCUMENTS

| | | |
|---|---|---|
| EP | 2966863 A1 | 1/2016 |
| KR | 20150020801 A | 2/2015 |
| WO | 2012118573 A1 | 9/2012 |
| WO | 2015048911 A1 | 4/2015 |
| WO | 2018116253 A1 | 6/2018 |

OTHER PUBLICATIONS

Langloiz, Tobias, et al., "Real-Time Radiometric Compensation for Optical See-Through Head-Mounted Displays", IEEE Transactions on Visualization and Computer Graphics, vol. 22, No. 11, Nov. 2016, 1-10.

Bimber, Oliver, et al., "Modern Approaches to Augmented Reality", Spatial Augmented Reality, Siggraph 2005, 2005, 1-86.

Owen, Charles B., et al., "Display-Relative Calibration for Optical See-Through Head-Mounted Displays", Proceedings of the Third IEEE and ACM International Symposium on Mixed and Augmented Reality (ISMAR 2004), IEEE Computer Society, 2004, 1-9.

* cited by examiner

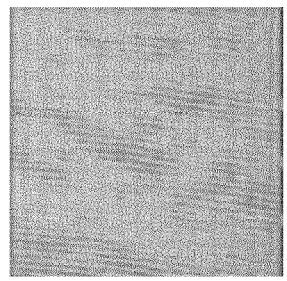 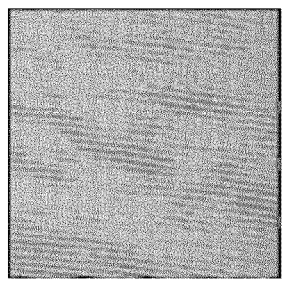 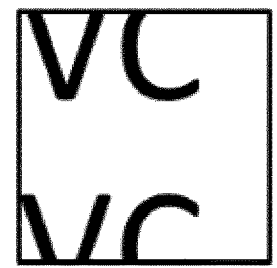 DVC
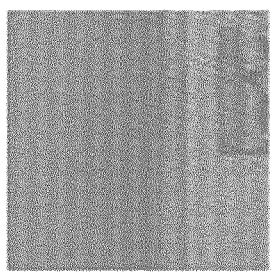 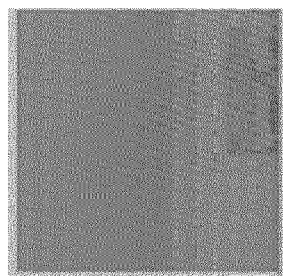 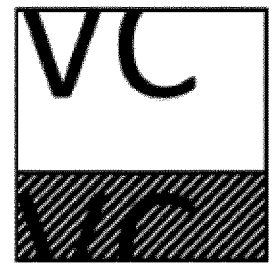 CDVC
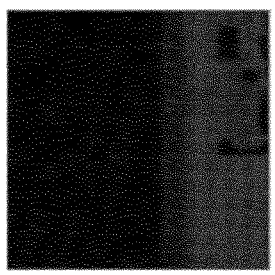 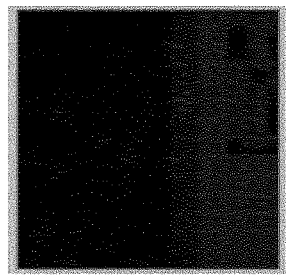 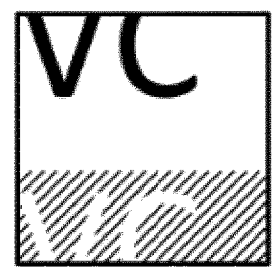 D
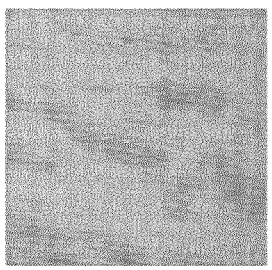 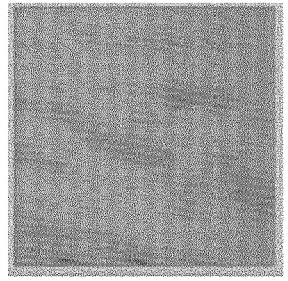 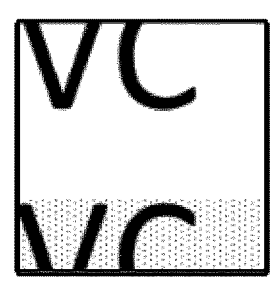 MDVC
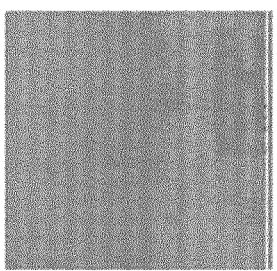 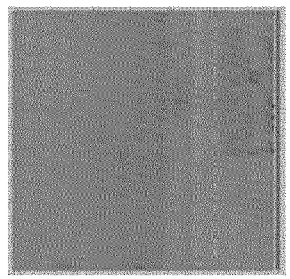 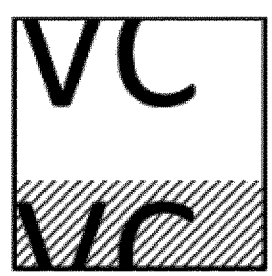 CORRECTED VIEW
FIG. 7A     FIG. 7B     FIG. 7C

OPTICAL SEE-THROUGH VIEWING DEVICE AND METHOD FOR PROVIDING VIRTUAL CONTENT OVERLAPPING VISUAL OBJECTS

TECHNICAL FIELD

The present invention relates to an optical see-through viewing device and a method, and in particular to an optical see-through viewing device and a method for providing virtual content overlapping visual objects that is easy to perceive.

BACKGROUND

Virtual Reality (VR) systems are growing in popularity. Similarly so-called mixed or augmented reality systems are also growing in popularity. In contrast to virtual reality systems, where everything is virtual, augmented reality systems are based on a real world view onto which virtual content is displayed. A user is thus presented with a real world view of real life objects and the view is augmented with virtual objects or contents providing functionality and/or information. A very popular example is the game Pokemon Go™ where a user looks at his smartphone screen on which a video capture of the current camera view is shown. On to this camera view certain symbols and "monsters" are displayed as virtual objects enabling the user to see information and "monsters" that is hidden to the naked eye and to go hunt for the "monsters". Pokemon Go™ is an example of Video See-Through, where a camera captures what is behind a smartphone and this is displayed on the smartphone's display overlaid with virtual content.

However, in optical see-through (OST) systems the user is not presented with a camera capture, but the user actually sees through a device and looks at the real life world directly.

The inventors have realized a problem that exist in optical see-through systems when equipped with augmented reality, namely that all the displayed virtual content will be backlit by the incoming light from the real world. The displayed virtual content will thus not completely obscure the overlapped visual objects (as in camera-based systems). This may result in that the real life visual object may be perceivable through the displayed virtual content and/or that the displayed virtual content may be perceived as distorted. In other words, in OST systems the background may "bleed" into the displayed virtual content, thereby distorting or compromising the displayed virtual content.

As this application relates to handling and manipulation of color, there will be a triple set of figures for each figure illustrating a view of the viewing device disclosed herein. A first figure will be in color and denoted 'A', a second figure will be a greyscale figure denoted 'B', and a third figure will be a schematic figure denoted 'C' showing the problem and/or effect in an illustrative manner.

FIGS. 1A, 1B and 1C each shows a schematic view of the problem as it appears in prior art systems, where a pair of optical see through (OST) augmented reality glasses overlays a virtual image on the physical world. The left side (L) of FIG. 1 shows a view 10A of the intended or projected virtual content to be displayed (DVC) 20 and the right side (R) shows the composite view 1013 of the displayed virtual content (DVC) 20 overlapping the background 30. A comparison of the left side and the right side of FIG. 1 shows the problem that may arise in such systems is that there will be different background behavior depending on the environmental conditions as this will be ranging from bright sun to pitch dark, vivid colors to grey. The background will interfere with the virtual image and, depending on background, alter the perceived virtual image. The background will thus compromise or distort the displayed virtual content by adding content, color and/or contrast change to the virtual content.

An augmented reality system will, herein, be defined as a system where virtual content is displayed as overlapping (physical) real-life visual objects. There will thus not be made any difference between augmented reality, mixed reality or enhanced reality for the context of this application and the problems and their solutions discussed herein applies to all Optical See-Through (OST) devices.

Proposed prior art solutions have been focused on analyzing the background and blocking out disturbing objects in the background to render the virtual content easy to perceive.

However, such solutions require a lot of processing power, and usually also costly peripherals to be used. Furthermore, as the background changes, the manipulation of the background must also change which is distracting to a user.

There is thus a need for a viewing device and a method for providing virtual content that is easy to perceive in OST systems.

SUMMARY

An object of the present teachings is to overcome or at least reduce or mitigate the problems discussed in the background section.

According to one aspect an Optical See-Through viewing device is provided, the OST viewing device comprising a controller configured to control a display arrangement comprising an image capturing device, wherein the controller is further configured to:

a) display virtual content overlapping at least one real-life object viewable by a user's eye through the Optical See-Through viewing device;

b) capture a composite view of displayed virtual content overlapping real life object;

c) determine captured virtual content based on composite view;

d) determine a difference between captured virtual content and the displayed virtual content;

e) determine modified virtual content based on the difference; and f) display the modified virtual content.

This has the benefit that by modifying the virtual content based on a determined difference, any impact of overlapped real life objects may be reduced or overcome.

In one embodiment the controller is further configured to repeat a) to f) until the difference is below a threshold.

In one embodiment the controller is further configured to determine the modified virtual content by determining the color complement of the difference.

In one embodiment the controller is further configured to determine the modified virtual content by adapting the illumination of the displaying of the virtual content.

In one embodiment the controller is further configured to determine the difference (D) by a pixel-wise subtraction.

In one embodiment the controller is further configured to determine the difference (D) by transforming the captured virtual content and the displayed virtual content from a first color space into a second color space, determine the difference in the second color space, and then perform a transformation back to the first color space.

In one embodiment the controller is further configured to calibrate the image capturing device to the display arrangement by displaying virtual content; capturing the displayed virtual content; determining a center point of the displayed virtual content; determining a center point of the captured virtual content; and adapting a field of view of the image capturing device accordingly.

According to one aspect an Optical See-Through viewing device is provided, the OST viewing device comprising a controller configured to control a display arrangement comprising an image capturing device, wherein the controller is further configured to: calibrate the image capturing device to the display arrangement by determining a difference between the displayed virtual content and the captured virtual content; and adapting settings according to the difference between the displayed virtual content and the captured virtual content.

In one embodiment the controller is further configured to align the image capturing device to the user's eye by: displaying virtual content; capturing the displayed virtual content; displaying the captured virtual content; adapting the image capturing device according to a spatial difference between the captured virtual content and the displayed virtual content.

According to one aspect an Optical See-Through viewing device is provided, the OST viewing device comprising a controller configured to control a display arrangement comprising an image capturing device, wherein the controller is further configured to: align the image capturing device to the user's eye by: capturing a view of a real life object; displaying the captured real life object; and adapting the image capturing device according to a spatial difference between the captured real life object and the real life object.

In one embodiment the image capturing device further comprises an image capturing device moving arrangement, wherein the controller is further configured to adapt the image capturing device according to the spatial difference by causing the image capturing device to be moved.

In one embodiment the image capturing device further comprises a user interface and the controller is further configured to receive user input through said user interface and adapt the image capturing device by moving the image capturing device according to the received user input.

In one embodiment the image capturing device further comprises a user interface and the controller is further configured to adapt the image capturing device by moving the image capturing device in at least one of two directions. In one embodiment, the two directions define a two dimensional area within which the image capturing device is movable. In one embodiment the two directions are orthogonal to one another.

In one embodiment the image capturing device further comprises a user interface and the controller is further configured to adapt the image capturing device by moving the image capturing device in at least one of three directions. In one embodiment, the three directions define a three dimensional space within which the image capturing device is movable. In one embodiment the three directions are orthogonal to one another.

In one embodiment the image capturing device further comprises a user interface and the controller is further configured to adapt the image capturing device by moving the image capturing device in an angular direction.

In one such embodiment, the image capturing device is arranged to be tilted at an angle.

In one such embodiment, the image capturing device is arranged to be rotated at an angle.

In one such embodiment, the image capturing device is arranged to be tilted at a first angle and to be rotated at a second angle.

In one embodiment the display arrangement comprises a projector and a transparent mirror wherein the image capturing device is arranged within an at least virtual or reflected line of sight of the user. As the line of sight may be reflected by the transparent mirror the image capturing device 112 may be arranged in or adjacent to a line of sight of the user, without actually being in the line of sight of the user, as the image capturing device could the obscure the view of the user.

In one embodiment the image capturing device is arranged adjacent to a location of the user's eye when using the viewing device.

In one embodiment the image capturing device is arranged adjacent to the projector.

In one embodiment the image capturing device is arranged on an opposite side of the transparent mirror to the projector.

According to one aspect a method for use in an OST viewing device is provided, the method being for enhancing the readability of virtual content in the Optical See-Through viewing device comprising a controller configured to control a display arrangement comprising an image capturing device, wherein the method comprises:

a) displaying virtual content overlapping at least one real-life object viewable by a user's eye through the Optical See-Through viewing device;

b) capturing a composite view of displayed virtual content overlapping real life object;

c) determining captured virtual content based on composite view;

d) determining a difference between captured virtual content and the displayed virtual content;

e) determining modified virtual content based on the difference; and f) displaying the modified virtual content.

According to one aspect a method for use in an OST viewing device is provided, the method being for enhancing the readability of virtual content in the Optical See-Through viewing device comprising a controller configured to control a display arrangement comprising an image capturing device, wherein the method comprises calibrating the image capturing device to the display arrangement by displaying virtual content; capturing the displayed virtual content; determining a center point of the displayed virtual content; determining a center point of the captured virtual content; and adapting a field of view of the image capturing device accordingly.

According to one aspect a method for use in an OST viewing device is provided, the method being for enhancing the readability of virtual content in the Optical See-Through viewing device comprising a controller configured to control a display arrangement comprising an image capturing device, wherein the method comprises aligning the image capturing device to the user's eye by: displaying virtual content; capturing the displayed virtual content; displaying the captured virtual content; and adapting the image capturing device according to a spatial difference between the captured virtual content and the displayed virtual content.

According to one aspect there is provided a computer-readable medium carrying computer instructions that when loaded into and executed by a controller of a viewing device enables the viewing device to implement a method according to herein.

According to one aspect there is provided a software component arrangement for enhancing the readability of virtual content in an Optical See-Through viewing device comprising a controller configured to control a display arrangement comprising an image capturing device, wherein the software component arrangement comprises:

a) a software component for displaying virtual content overlapping at least one real-life object viewable by a user's eye through the Optical See-Through viewing device;

b) a software component for capturing a composite view of displayed virtual content overlapping real life object and for;

c) determining captured virtual content based on composite view;

d) a software component for determining a difference between captured virtual content and the displayed virtual content;

e) a software component for determining modified virtual content based on the difference; and f) a software component for displaying the modified virtual content.

According to one aspect there is provided a software component arrangement for enhancing the readability of virtual content in an Optical See-Through viewing device comprising a controller configured to control a display arrangement comprising an image capturing device, wherein the software component arrangement is for calibrating the image capturing device to the display arrangement and comprises: a software component for displaying virtual content; a software component for capturing the displayed virtual content; a software component for determining a center point of the displayed virtual content; a software component for determining a center point of the captured virtual content; and a software component for adapting a field of view of the image capturing device accordingly.

According to one aspect there is provided a software component arrangement for enhancing the readability of virtual content in an Optical See-Through viewing device comprising a controller configured to control a display arrangement comprising an image capturing device, wherein the software component arrangement is for aligning the image capturing device to the user's eye and comprises: a software component for displaying virtual content; a software component for capturing the displayed virtual content; a software component for displaying the captured virtual content; and a software component for adapting the image capturing device according to a spatial difference between the captured virtual content and the displayed virtual content.

Further embodiments and advantages of the present invention will be given in the detailed description.

BRIEF DESCRIPTION OF THE DRAWINGS

Embodiments of the invention will be described in the following, reference being made to the appended drawings which illustrate non-limiting examples of how the inventive concept can be reduced into practice.

As this application relates to handling and manipulation of color, there will be a triple set of figures for each figure illustrating a view of the viewing device disclosed herein. A first figure will be in color and denoted 'A', a second figure will be a greyscale figure denoted 'B', and a third figure will be a schematic figure denoted 'C' showing the problem and/or effect in an illustrative manner.

FIGS. 7A, 7B and 7C each shows a schematic view of how displayed content may be modified according to an embodiment of the present invention;

DETAILED DESCRIPTION

Figure 2:
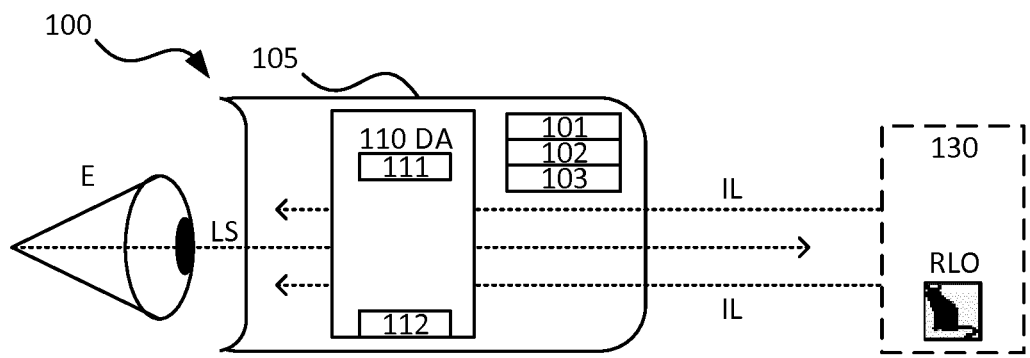
FIG. 2 shows a schematic view of an optical see-through viewing device according to an embodiment of the present invention.

FIG. 2 shows a schematic view of an optical see-through (OST) viewing device 100 according to an embodiment of the present invention. The viewing device 100 is a see-through device, where a user looks in through one end, and sees the real-life objects (RLO) present at the other end or in the line of sight (indicated LS in FIG. 2) at the other end of the viewing device 100. In one embodiment the viewing device 100 is a head-mounted viewing device 100 to be worn by a user (not shown explicitly but represented by the eye E in FIG. 2) for looking through the viewing device 100. In one such embodiment the viewing device 100 is arranged as glasses, or other eye wear including goggles, to be worn by a user.

The viewing device 100 is in one embodiment arranged to be hand-held, whereby a user can hold up the viewing device 100 to look through it.

The viewing device 100 is in one embodiment arranged to be mounted on for example a tripod, whereby a user can mount the viewing device 100 in a convenient arrangement for looking through it. In one such embodiment, the viewing device 100 may be mounted on a dashboard of a car or other vehicle.

The viewing device 100 comprises a housing 105 and transparent display arrangement 110. The display arrangement 110, is self-illuminating, and is therefore configured to be capable of displaying content for example using a projector, a Liquid Cristal Display (LCD) or an Organic Light-Emitting Diode (OLED) display 111. The following examples will be given assuming a projector is used, but it should be noted that this is only one possible alternative. The display arrangement 110 is arranged in the housing 105 so that a visual object VO may be perceived along the line of sight, indicated LS in the figure, or field of view of an eye E looking through the viewing device 100.

The display arrangement 110 is configured to display virtual content DVC to be viewed by the user. As the display arrangement 110 is transparent, the displayed virtual content DVC will be perceived by a user as overlapping any visual real life objects RLOs viewed through the viewing device 100. The viewing device 100 is thus suitable for use with augmented reality, mixed reality and extended reality systems. For the purpose of this application, augmented reality AR will be considered to be the equivalent and interchangeable with the terminologies of mixed reality and extended reality. Further references will simply be to Augmented Reality (AR), but applies equally to mixed or extended reality.

Figure 3:
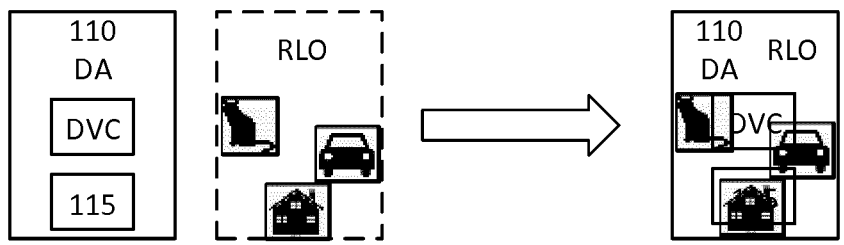
FIG. 3 shows a schematic view of the operation of a viewing device according to one embodiment of the teachings herein.

An example view of how the virtual content is displayed to overlap the real life objects RLOs 130 is shown in FIG. 3, which shows a schematic view of an exemplary view seen through the viewing device 100. On the left of the figure, there is shown the display arrangement 110 and the displayed virtual content DVC being displayed on the display arrangement 110 and also the current field of view 130 (dashed rectangle) with the visual real life objects RLOs currently viewable. In this example view, the real life objects RLOs are exemplified as a box showing a cat, a box showing a car, and a box showing a house. On the right of the figure, the composite of the two is shown, i.e. the view actually seen through the viewing device 100. As can be seen, the displayed virtual content DVC, also referenced 115 in the figures, is perceived as overlapping the real life objects RLOs thereby providing an augmented reality. As can also be seen, where the DVC overlaps the RLOs the DVC may become distorted or compromised, or at least be perceived as distorted or compromised by the user, making it more difficult to perceive the DVC.

The viewing device 100 also comprises an image capturing device 112, such as a camera or image sensor. The image capturing device 112 is arranged where it can capture an image (still or video stream) of the view seen by the user. The exact placement of the image capturing device 112 depends on the current display arrangement and design options, but is illustrated in FIG. 2 to be substantially opposite the projector 111. In one embodiment the image capturing device 112 is arranged next to or adjacent the projector 111. In one embodiment the image capturing device 112 is arranged next to or adjacent the user's Eye. For the purpose of this application, 'adjacent' (to an entity) is seen as 'to be next to' (the entity) and/or 'within a distance' (to the entity).

The viewing device 100 further comprises a controller 101 and a memory 102. The controller 101 is configured to control the display arrangement to display the virtual content.

The controller 101 is also configured to control the overall operation of the viewing device 100, including the display arrangement 110. In one embodiment, the controller 101 is a graphics controller. In one embodiment, the controller 101 is a general purpose controller. In one embodiment, the controller 101 is a combination of a graphics controller and a general purpose controller. As a skilled person would understand there are many alternatives for how to implement a controller, such as using Field-Programmable Gate Arrays circuits in addition or as an alternative. For the purpose of this application, all such possibilities and alternatives will be referred to simply as the controller 101.

In one embodiment, the controller 101 is configured to receive the virtual content to be displayed. In one embodiment, the controller 101 is configured to generate the virtual content to be displayed. In one embodiment, the controller 101 is configured to receive parts of the virtual content to be displayed and to generate parts of the virtual content to be displayed.

The memory 102 is configured to store graphics data and computer-readable instructions that when loaded into the controller 101 indicates how the viewing device 100 is to be controlled. The memory 102 may comprise several memory units or devices, but they will be perceived as being part of the same overall memory 102. There may be one memory unit for the display arrangement storing graphics data, one memory unit for the image capturing device storing settings, one memory for the communications interface (see below) for storing settings, and so on. As a skilled person would understand there are many possibilities of how to select where data should be stored and a general memory 102 for the viewing device 100 is therefore seen to comprise any and all such memory units for the purpose of this application. As a skilled person would understand there are many alternatives of how to implement a memory, for example using EEPROM memory circuits. For the purpose of this application all such alternatives will be referred to simply as the memory 102.

In one embodiment the viewing device 100 further comprises a communication interface 103. The communication interface may be wired and/or wireless. The communication interface may comprise several interfaces.

In one embodiment the communication interface comprises a USB (Universal Serial Bus) interface. In one embodiment the communication interface comprises a HDMI (High Definition Multimedia Interface) interface. In one embodiment the communication interface comprises a Display Port interface. In one embodiment the communication interface comprises an Ethernet interface. In one embodiment the communication interface comprises a MIPI (Mobile Industry Processor Interface) interface.

In one embodiment the communication interface comprises a radio frequency (RF) communications interface. In one such embodiment the communication interface comprises a Bluetooth™ interface, a WiFi™ interface, a ZigBee™ interface, a RFID™ (Radio frequency IDeintifier) interface, Wireless Display (WiDi) interface, Miracast interface, and/or other RF interface commonly used for short range RF communication. In an alternative or supplemental such embodiment the communication interface comprises a cellular communications interface such as a fifth generation (5G) cellular communication interface, an LTE (Long Term Evolution) interface, a GSM (Global Systéme Mobilé) interface and/or other interface commonly used for cellular communication. In one embodiment the communications interface is configured to communicate using the UPnP (Universal Plug n Play) protocol. In one embodiment the communications interface is configured to communicate using the DLNA (Digital Living Network Appliance) protocol.

In one embodiment, the communications interface 103 is configured to enable communication through more than one of the example technologies given above. As an example, a wired interface, such as MIPI could be used for establishing an interface between the display arrangement, the controller and the user interface, and a wireless interface, for example WiFi™ could be used to enable communication between the viewing device 100 and an external host device (not shown).

The communications interface 103 is configured to enable the viewing device 100 to receive and/or transmit data and/or instructions regarding the virtual content to be displayed. The communications interface 103 may also be configured to enable the viewing device 100 to communicate with other devices, such as other viewing devices 100 and/or smartphones, internet tablets, computer tablets or other computers, media devices, such as television sets, gaming consoles, video viewer or projectors (not shown).

Figure 4:
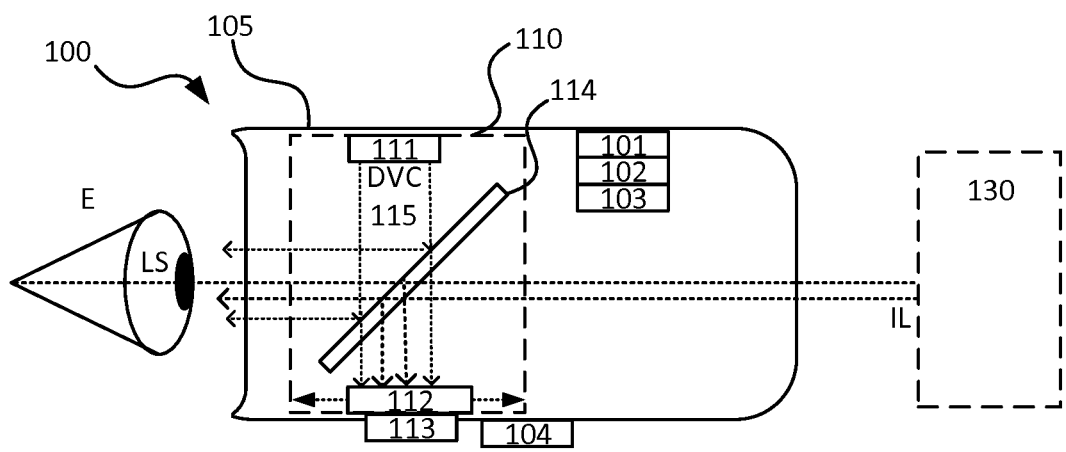
FIG. 4 a schematic view of an optical see-through viewing device according to an embodiment of the present invention.

FIG. 4 shows a schematic view of a viewing device 100 according to one embodiment of the teachings herein. The display arrangement 110 of the viewing device 100 comprises a projector device 111 and a partially transparent mirror 114. Examples of projector devices 111 are, but not restricted to, a DLP (Digital Light Processing) projector, an LCD (Liquid Cristal Display), an LED (Light Emitting Diode) or OLED (Organic Light Emitting Diode) display. The projector device 111 is arranged to project the content to be displayed DVC also referenced 115 onto the partially transparent mirror 114. The partially transparent mirror 114 is arranged to reflect the displayed virtual content DVC to a user and to enable real life objects RLOs to be perceivable through the partially transparent mirror. The user will thereby perceive the displayed virtual content DVC as overlapping the RLOs. In one embodiment, the mirror 114 is arranged at an angle of 45 degrees relative the line of sight of the user, or, alternatively, relative the projector 111.

The image capturing device 112 of the display arrangement 110 is arranged opposite the projector 112, i.e. on the other side of the mirror 114. As noted in relation to FIG. 2, the image capturing device 112 may also be arranged adjacent the user's eye or adjacent the projector 111, i.e. on the same side of the mirror 114 as the projector. Arranging the image capturing device 112 adjacent the projector 111 or adjacent the eye provides for a simpler or smarter housing 105, as no underside of the housing is technically needed or at least can be made smaller. Arranging the image capturing device 112 on the opposite side of the mirror 114 provides for a higher degree of freedom of movement for the image capturing device 112, thereby providing a more efficient calibration.

The image capturing device 112 is, in any embodiment, arranged to substantially lie in the line of sight of the user, at least in a reflected line of sight. The image capturing device 112 will thus be able to capture what the user's sees. For the embodiment where the image capturing device 112 is arranged opposite the projector 111 (as is illustrated in FIG. 4), the image capturing device 112 is arranged on the underside of the mirror 114. As can be seen, the line of sight LS (or rather its reflection in the transparent mirror 114) corresponds to or falls in the center of the image capturing device 112. The image capturing device 112 is thus aligned with the eye E. The image capturing device 112 will thus capture the same view as is seen by the user. This is indicated by all arrows indicting the view of the DVC, the background 130 (the illuminating light IL) being captured by the image capturing device 130 in a similar manner as they are captured or received by the eye E.

It should be noted that even though the description herein is only focusing on one image capturing device 112, the actual number of image capturing devices 112 may depend on how many eyes the viewing device is arranged for. The viewing device 100 may thus be configured with one or two image capturing devices 112. For a multi-person viewing device 100, there may be more image capturing devices 112, one for each eye E.

As is indicated by the dashed arrows emanating from the image capturing device 112, the image capturing device 112 is in one embodiment arranged to be movable. The image capturing device may be movable in two dimensions (X-, Y-directions), or in three dimensions (X-, Y-, Z-directions). The image capturing device 112 may also be arranged to be movable in one (or two) angular directions, i.e. the image capturing device 112 may be tilted. In one embodiment the image capturing device 112 comprises an image capturing device moving arrangement 113 of one or more electric motors and a mechanical assembly for moving the image capturing device 112. The mechanical assembly may comprise gears and levers. The image capturing device moving arrangement 113 may additionally or alternatively comprise an electromagnetic assembly for moving the image capturing device 112 by altering an electromagnetic field. The viewing device 100 may also comprise a user interface 104 for receiving input from a user. The user interface 104 may comprise actuators enabling a user to indicate how the image capturing device 112 should be moved, thereby enabling a user to move the image capturing device 112. The user interface may be connected (at least a part of it) directly to the image capturing device moving arrangement 113.

The image capturing device 112 may also or alternatively be arranged to be virtually movable, wherein the controller is configured to align the image captured by the image capturing device along different center lines. In one such an embodiment, the image capturing device 112 is arranged to capture a larger field of view than is perceivable by the eye. In such an embodiment, the user interface 104 may also be used to indicate how the image capturing device 112 should be moved virtually.

The user interface 104 may be comprised in the viewing device as physical means. Additionally or alternatively, (at least a part of) the user interface 104 may be comprised remotely in the viewing device 100 through the communication interface 103, the user interface then (at least a part of it) not being a physical means in the viewing device 100, but implemented by receiving user input through a remote device (not shown) through the communication interface 103. One example of such a remote device is a game controller, a mobile phone handset, a tablet computer or a computer.

Figure 5A:
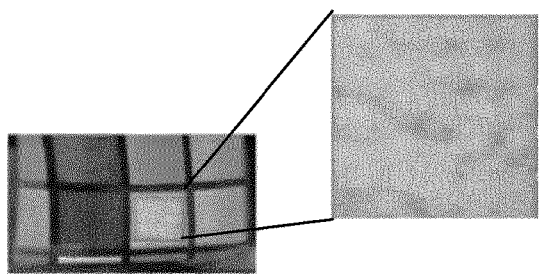
FIGS. 5A, 5B and 5C each shows a schematic view of how displayed content unaffected by background objects is seen by a user according to an embodiment of the present invention.
Figure 6A:
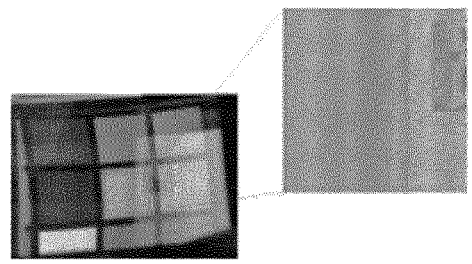
FIGS. 6A, 6B and 6C each shows a schematic view of how displayed content affected by background objects is seen by a user according to an embodiment of the present invention.
Figure 5B:
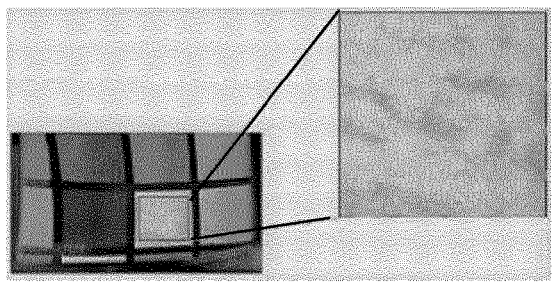
Figure 6B:
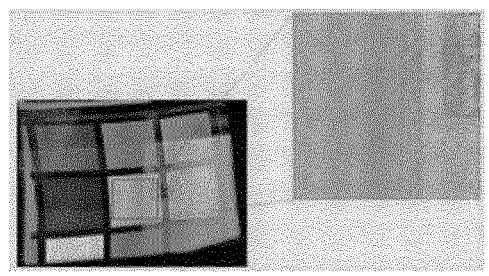
Figure 5C:
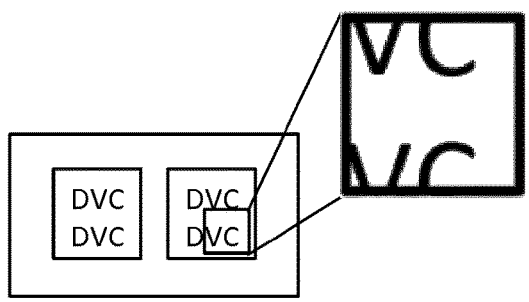
Figure 6C:
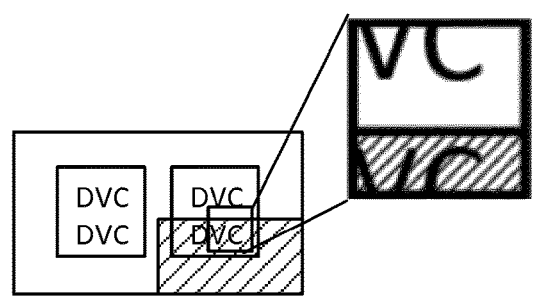

FIGS. 5A, 5B and 5C as compared to FIGS. 6A, 6B and 6C shows the impact that overlapped real-life objects may have on displayed virtual content. In FIG. 5 it is shown how displayed virtual content should be perceived if not distorted and in FIG. 6 it is shown how displayed virtual content is perceived as distorted by overlapped objects. In FIG. 6A, the distortion is a distortion of the color, whereby the overlapped real-life object is partially seen through the displayed virtual content. In FIG. 6B, the distortion is a distortion of the grey scale, whereby the overlapped real-life object is partially seen through the displayed virtual content. In FIG. 5C, the distortion is a distortion of the virtual content, whereby the overlapped real-life object is partially seen through the displayed virtual content.

FIGS. 7A, 7B and 7C respectively shows how the impact of overlapped real-life objects may be reduced or overcome. Starting at the top of FIG. 7, the displayed virtual content (DVC) is known to the controller 101. The image capturing device 112 is utilized to capture an image of the displayed virtual content as perceived by the user, the captured image showing the captured displayed virtual content (CDVC). By comparing the displayed virtual content (DVC) to the captured displayed virtual content (CDVC) a difference (D) may be determined.

In one embodiment, the difference (D) is determined by a pixel-wise subtraction of the colors of the displayed virtual content (DVC) and the captured displayed virtual content (CDVC).

The pixel-wise subtraction may be made in the color space of the captured image, for example in an RGB (Red, Green, Blue) color space or a CMYK (Cyan, Magenta, Yellow, blacK) color space.

Additionally or alternatively, the pixel-wise subtraction may be preceded by a transformation into a second color space, for example a HSV (Hue, Saturation, Value) color space, after which a transformation back to the original (or first) color space is performed. By transforming into a second color space, control of different aspects of the resulting view is achieved. A transformation into a HSV color space, for example, enables for an improved control of the color tone of the difference (where the saturation and the hue is adapted to resemble the original), and thus later the modified virtual content to be displayed (see below). Another example of a second color space is HSL (Hue, Saturation, Lightness).

In one embodiment the determination of the difference (D) is additionally or alternatively based on an edge detection. As the resulting view most likely contains an unwanted edge (due to the overlapped background), detecting such an edge enables for a more focused determination of the difference (D) as only the area surrounding the detected edge need be investigated for determining the difference. In such an embodiment, the pixel-wise subtraction may then be performed only in an area surrounding the detected (unwanted) edge. That an edge is unwanted can be determined based on known edges in the virtual content being displayed.

A modified displayed virtual content (MDVC) is then determined based on the difference (D).

In one embodiment, the modified displayed virtual content (MDVC) is determined as a color complement to the difference (D).

In one alternative or additional embodiment, the modified displayed virtual content (MDVC) is determined by adapting some aspects of the chosen color space according to how other aspects of the color space have been determined. One such example is during a transformation into a HSV space for determining the difference focusing on the aspect tone, and then adapting the aspects saturation and hue are adapted to resemble the original DVC.

The modified displayed virtual content (MDVC) may alternatively or additionally be determined by adapting the illumination of the displaying of the virtual content, based on the difference (D). For example, if there is a brightly illuminated real-life object being overlapped by virtual content, the virtual content may be displayed at a higher illumination so as to try and outshine the overlapped real-life object.

The modified displayed virtual content (MDVC) may alternatively or additionally be determined by adapting the color of the DVC. For example, if the difference (D) is determined to be too large, i.e. exceeding a threshold value, the MDVC may be determined by changing the color scheme (as opposed to the color space) of the DVC. For example, if the background is green and a blue DVC is displayed, this will result in a distortion of the DVC into yellow. Changing the DVC to then for example be yellow will lower the interference caused by the background. Or even, change some aspects of the DVC to the background color, whereby the background light or illumination may be used to generate the DVC by simply not projecting the fields having the same color as the background.

The modified virtual content is then displayed instead of the virtual content, whereby the impact of the overlapped real-life objects is reduced or overcome.

This procedure may be repeated determining a new modified virtual content until the difference (D) is below a threshold value indicating that the impact is negligent or acceptable.

In one embodiment, the procedure may be repeated until the controller determines that the difference is negligible, i.e. under a threshold value, and then automatically stops repeating the procedure. In one embodiment, the procedure may be repeated until the user determines that the difference is negligible and then instructing the controller through the user interface to stop repeating the procedure. In one embodiment, the controller is configured to store the current difference D, or a value close to the difference, such as rounded down or reduced by 10%, 15% or 20%, as a new threshold value.

To enable an adjustment of the parts of the virtual content to be displayed with what the user will perceive to be overlaid with the virtual content, the image capturing device 112 needs to be calibrated to the user's eye(s) E.

The calibration may be done for one eye or for two depending on the design of the OST viewing device.

As mentioned above, the calibration is performed by adjusting the image capturing device 112. However, it might also be possible to adjust other components, either as an alternative or as a supplement to adjusting the image capturing device 112. For example, the projector may also be adjusted so as to align the virtual content with what a user perceives.

Figure 8A:
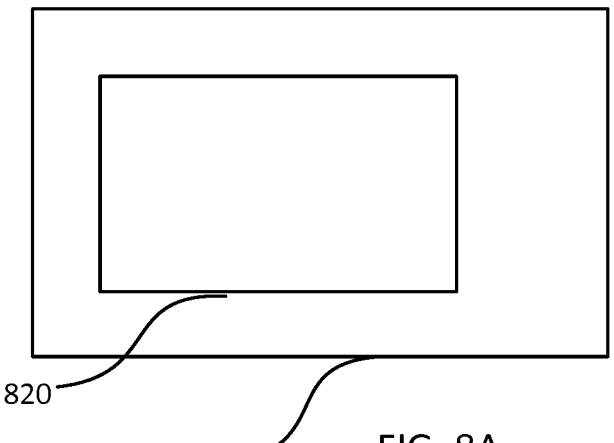
FIGS. 8A, 8B and 8C each shows a schematic illustration of how the image capturing device is aligned with the display arrangement.
Figure 8B:
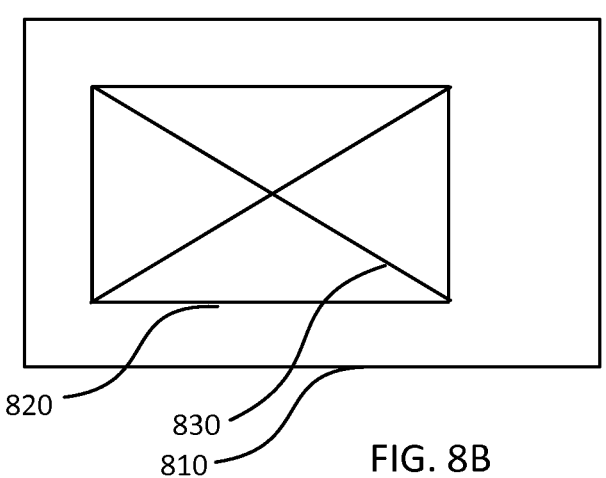
Figure 8C:
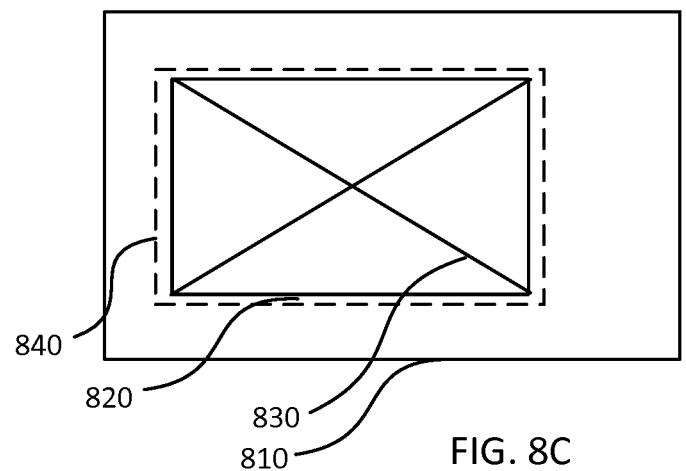

The calibration includes aligning the image capturing device 112 with the display arrangement 110 to ensure that the center point of the image capturing device coincides with the center point of the projection. This may be done by cropping the display area (or active area) of the display arrangement 110. It should be noted that the field of view of the image capturing device 112 may be larger than the display area of the display arrangement 110. The difference in size between the field of view of the image capturing device 112 and the size of the display area of the display arrangement 110 determines how much the image capturing device 112 may be adjusted. FIG. 8A shows a schematic illustration of how the field of view 810 of the image capturing device 112 is larger than the active area 820 of the display arrangement 110. The display arrangement 110 displays an image, and the image capturing device 112 captures a view of that image. By determining a center point of the image displayed, and finding the corresponding center point in the captured view of the image, the image capturing device 112 can be aligned with the display arrangement 110. In one embodiment, the view displayed is a test image having a clearly defined center point. FIG. 8B shows a schematic illustration of how an image 830 is displayed in the active area 820 of the display arrangement. In one embodiment, the image capturing device 112 is aligned with the display arrangement by cropping the field of view of the image capturing device 112. FIG. 8C shows a schematic illustration of how the field of view 820 of the image capturing device 112 is cropped by indicating an active, cropped field of view 840 for the image capturing device 112. In the illustration of FIG. 8C, the cropped field of view is slightly larger than the active area 820 of the display arrangement 110. However, it should be noted that the cropped field of view may be larger, smaller or of the same size as the active area of the display arrangement.

As the controller of the viewing device knows which color the image displayed is supposed to have, the image capturing device 112 may also be adapted according to the display arrangement by comparing the color scheme of the captured image and the displayed image and adapting the settings accordingly.

In addition to calibrating or aligning the image capturing device 112 to the display arrangement 110, the image capturing device 112 should also be calibrated to the user's eye(s) E.

Figure 9:
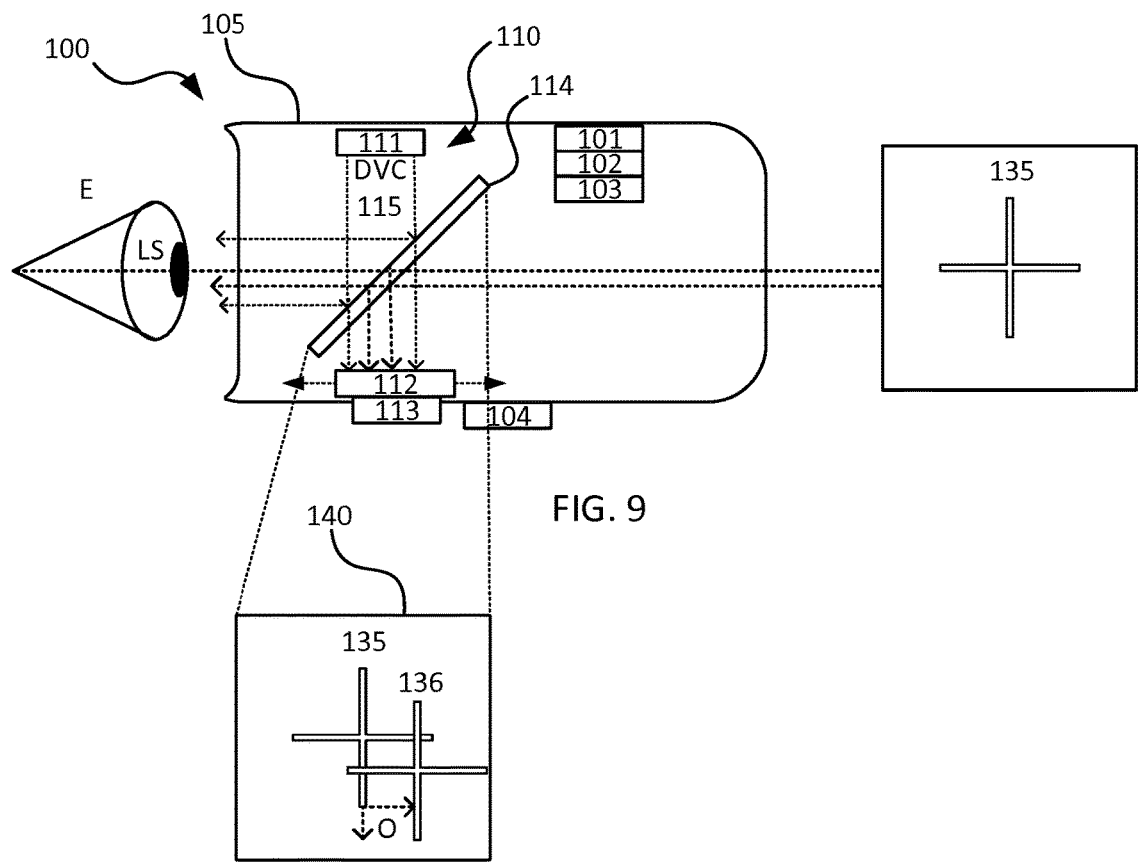
FIG. 9 shows a schematic view of a calibration of an optical see-through viewing device according to an embodiment of the present invention.

The calibration of the image capturing device 112 to the user's eye(s) E may be done by the user viewing an image or scenery. It is beneficial if the image or scenery has clearly at least one recognizable feature. In one embodiment a calibration chart is held up before the viewing device 100. FIG. 9 shows an example where a calibration image 135 is viewed through the viewing device 100. In this example the calibration image 135 shows a large cross as a clearly recognizable object, but it should be noted that this is merely one example.

The image capturing device 112 captures an image of the calibration image 135, which captured image is displayed by the display arrangement 110 as displayed virtual content DVC. The resulting view 140 seen by the user is also shown in FIG. 9. If the image capturing device 112 is not aligned with the user's eye(s) E, the captured image 136 will not fully overlap the viewed image 135. This is the case in FIG. 9, where the displayed captured image 136 is offset the viewed image 135 a spatial difference indicated by a dashed offset "O".

In one embodiment, the display arrangement 110 is configured to display the image to be viewed, whereby the image capturing device 112 captures a view of the image to be viewed and the captured view is also displayed by the display arrangement 110. The resulting view 140 will look the same as if an image is viewed through the viewing device and the user may notice an offset between the image to be viewed 135 and the captured mage 136.

Utilizing the user interface 104, the user may cause the image capturing device 112 to be moved in a direction to minimize the offset.

In one embodiment, the image capturing device 112 is (again) aligned with the display arrangement as the image capturing device 112 is moved to compensate for the move of the image capturing device 112. The (re-)alignment may be determined based on the user control received through the user interface 104. The (re-)alignment may alternatively or additionally be determined based on the viewed image 135 as discussed in the above regarding cropping the field of view of the image capturing device 112.

In one embodiment this procedure is repeated until the user determines that the image capturing device 112 is aligned with the user's eye(s) E.

Figure 10:
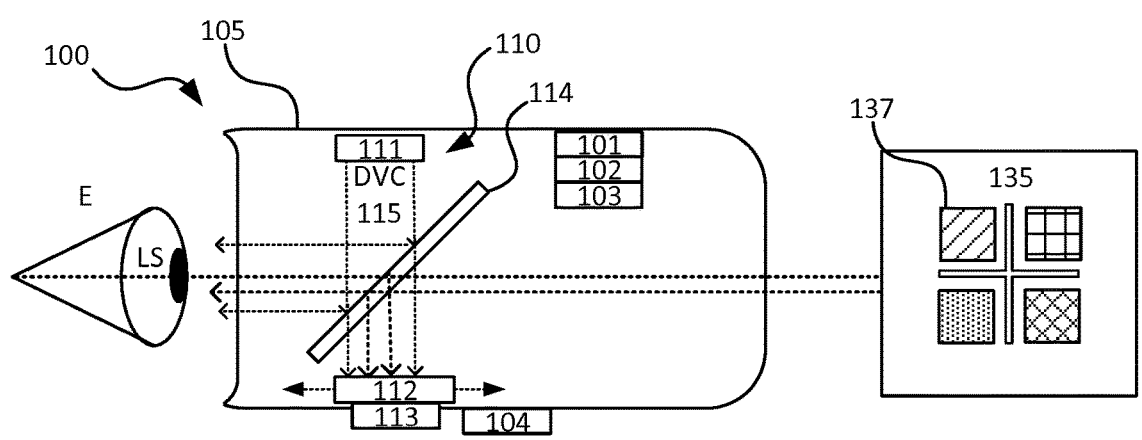
FIG. 10 shows a schematic view of a calibration of an optical see-through viewing device according to an embodiment of the present invention.

As the viewing device 100 and the display arrangement 110 in particular comprises at least one layer through which the incoming light will need to travel through before reaching the user's eye(s) E, the received light will have become distorted in some manner(s). In one embodiment, the image capturing device 112 is therefore calibrated to accommodate for such distortion. FIG. 10 shows a schematic view of a calibration image 135 where calibration fields 137 of different colors, contrast and/or greyscale are displayed. This calibration image 135 may be the same as the image to be viewed 135 discussed above. The calibration fields 137 may be a GregTag Macbeth® chart. In an embodiment where the display arrangement comprises a (semi-) transparent mirror 114, the mirror 114 will reduce the incoming light, tint the color of the incoming light and possibly optically distort the image viewed. In one embodiment the image capturing device 112 is therefore calibrated according to one or more of the calibration aspects below.

1. System distortion—The image capturing device 112 is calibrated based on its lens system to reduce any distortion caused by the lenses.
2. Lens shading—The image capturing device 112 is calibrated based on shading parameters so that a pixel image output is even both in terms of luminance and color. This may be based on the calibration fields 137 of the calibration image 135. As mentioned above, the calibration fields may be of color, grey scale or a combination of the two. The calibration image 135 may be specific to one of the calibrations, for example using a color calibration image for the distortion calibration and a grey scale calibration image 135 for the lens shading calibration. For the purpose of this application text, only one calibration image will be referred to, but it should be understood that different images may be used for different calibrations.
3. White balance calibration—The image capturing device 112 is calibrated based on the white balance at different target illuminations. This may be based on the calibration fields 137 of the calibration image 135.
4. Final tuning—The image capturing device 112 may also be recalibrated so that correct colors are identified. Such a calibration is highly dependent on the image capturing device 112 manufacturer. Usually a GregTag Macbeth® chart is used to match colors. As would be understood, such a calibration includes several steps known to a skilled person that may be performed with the viewing device 100. In one embodiment, the calibration image is used for fine-tuning the calibration.

As the calibration is done, the settings are stored in the memory 102 of the viewing device 100 so that the settings may be loaded and utilized upon startup of the image capturing device 112. The settings may also be associated with a user identity so that at least partially different calibration settings are used for different users. As indicated above, the memory 102 may comprise more than one memory unit, but all of the viewing devices memory units will be referred to as the same memory 102. As a skilled person would understand, there exist numerous possibilities of choosing where to actually store data and parameters such as storage space, access speeds and communication speeds determine where a designer or a controller chooses where to store specific data. In one embodiment, the calibration data is stored in a memory unit comprised in the image capturing device for enabling a faster access. However, for the purpose of this application, as mentioned above, the image capturing device's memory is considered to be part of the overall memory 102.

Figure 1A:
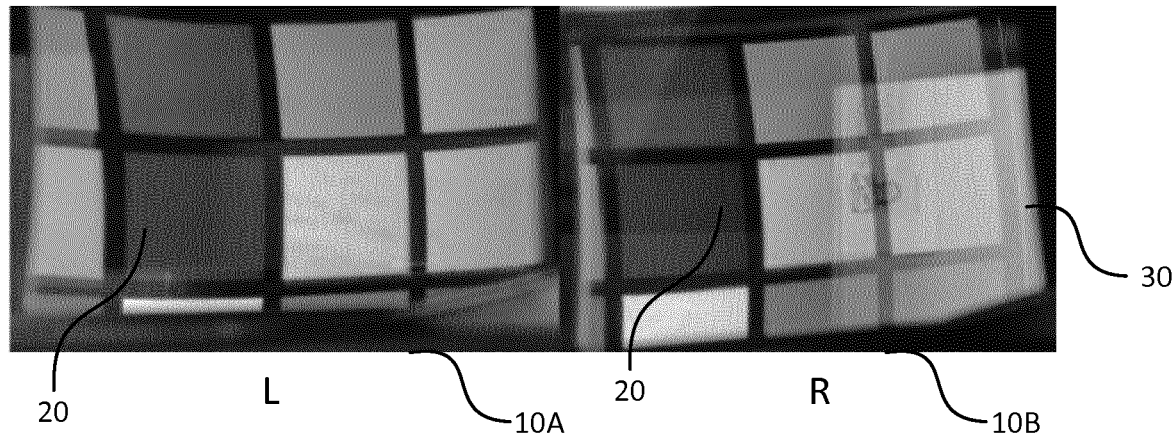
FIGS. 1A, 1B and 1C each shows a schematic view of the problem as it appears in prior art systems.
Figure 1B:
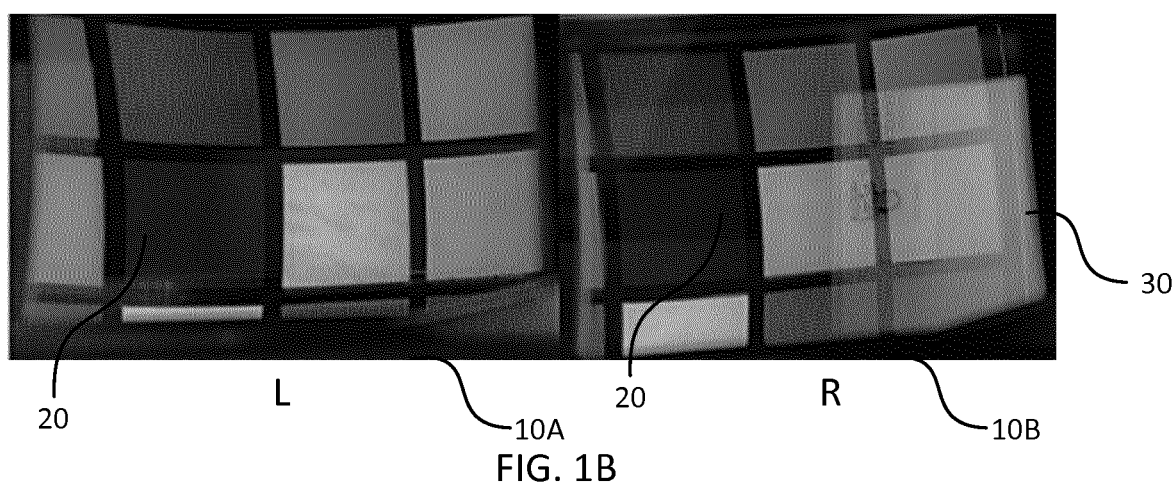
Figure 1C:
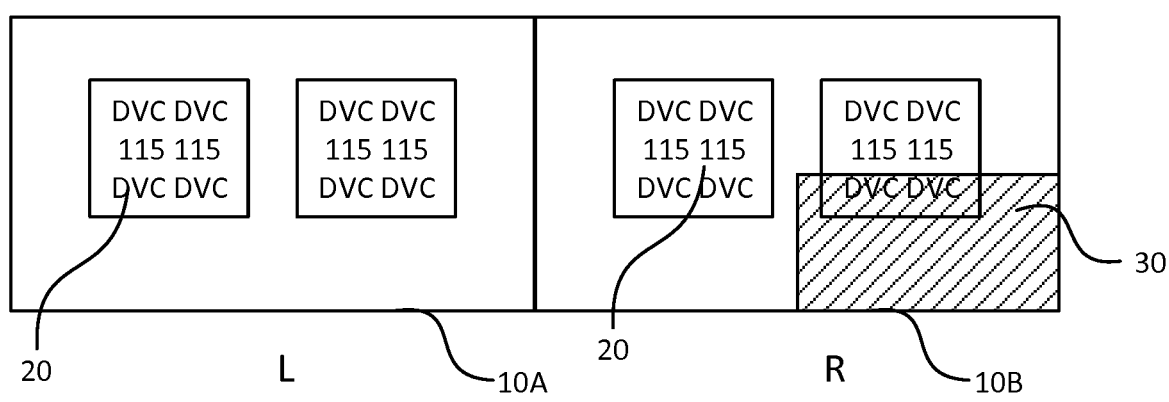

Returning to FIG. 1 showing the problem of how virtual content being displayed overlapping a visual background of low contrast or being cluttered, it will now be disclosed how a viewing device 100 according to the teachings herein is configured to at least partially overcome this problem with simultaneous reference to FIGS. 1, 4, 5, 6, 7, 8, 9, 10 and 11 FIG. 11 showing a schematic flowchart of a general method according to the teachings herein.

The inventors have realized through inventive thinking and reasoning that it is possible to display content that will always be easily perceivable without adding further virtual objects or content, by instead focusing on what is actually perceived by a user.

By enabling the image capturing device 112 to capture what the user sees, a comparison between what is seen (the perceived virtual content) and what is intended to be seen (the displayed virtual content) can be made.

As the content to be displayed is already known to the controller 101 of the viewing device 100, as it is received or even generated by the viewing device 100, the analysis becomes easy and uncomplicated not requiring much processing power.

Figure 11:
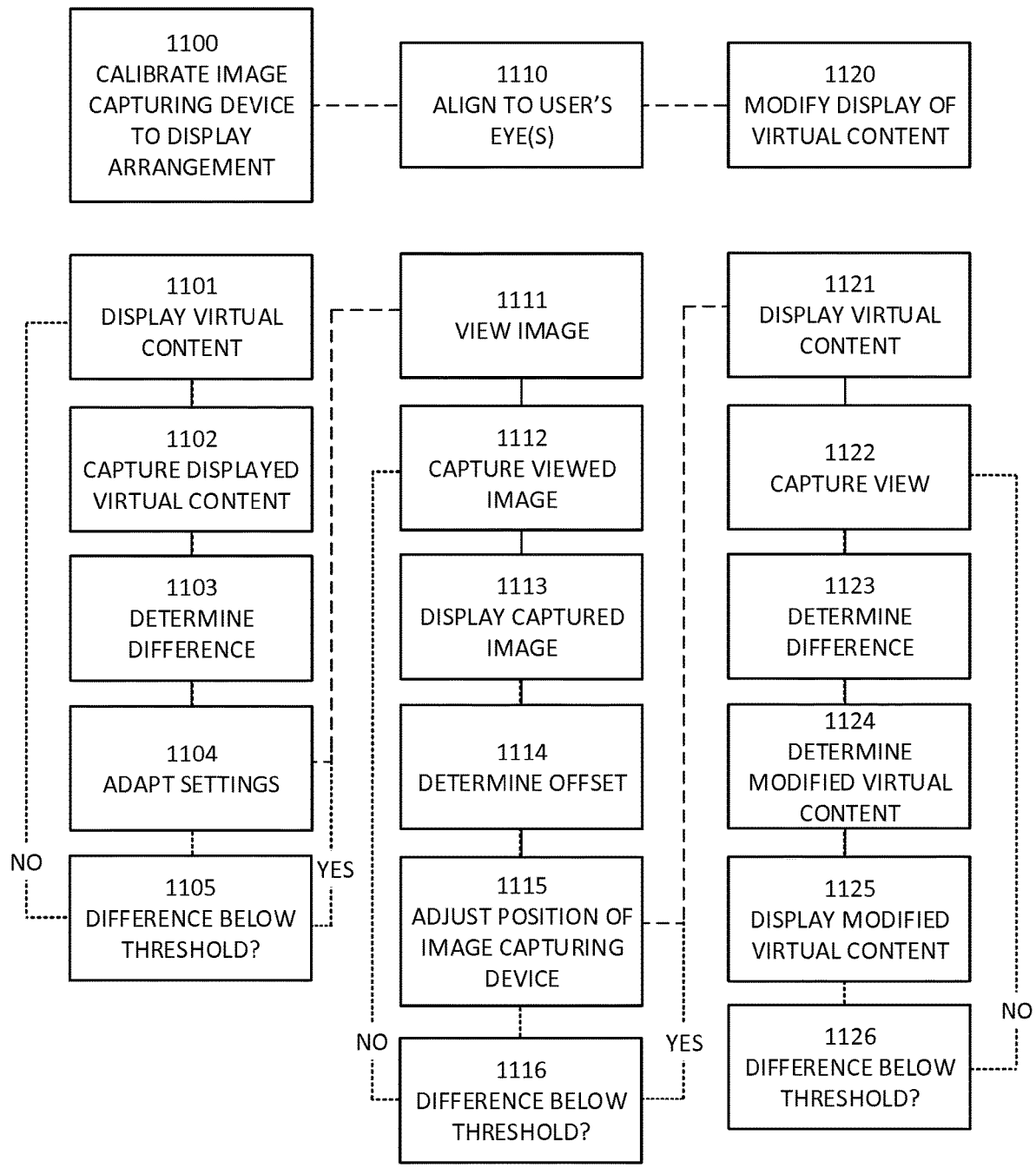
FIG. 11 shows a flowchart of a general method according to an embodiment of the present invention.

FIG. 11 shows a flowchart of a general method according to an embodiment of the teachings herein. The method utilizes a viewing device 100 as taught herein for enhancing the readability of virtual content in the viewing device 100. The method comprises calibrating the image capturing device 112 to the display arrangement 110 by displaying 1101 an image, capturing 1102 the displayed image with the image capturing device 112 and determine a difference in center points of the active area of the display arrangement and of the field of view of the image capturing device 112 and re-cropping and re-centering the field of view of the image capturing device 112 accordingly as part of adapting 1104 the settings of the image capturing device 112. The color settings may also be adapted based on a comparison between the displayed image and the captured image.

The image capturing device 112 is also calibrated according to the user, by aligning 1110 the image capturing device 112 to the user's eye(s) E by viewing 1111 an image through the viewing device 100 or being displayed in the viewing device 100, capturing 1112 the viewed image and displaying 1113 the captured image, whereby an offset between the viewed image and the captured image is determined 1114 and the position of the image capturing device 112 is adjusted 1115 accordingly.

The image capturing device 112 is then utilized to modify 1120 how virtual content is displayed so that overlapped real world objects may be filtered out, or at least the impact of such overlapped real life objects is reduced. The modification of the virtual content is performed by displaying 1121 the virtual content and capturing 1122 a view including the virtual content. Based on the captured view of the virtual content a difference is determined 1123 and based on the difference, it is determined 1124 how the virtual content should be modified to accommodate for the difference and the modified virtual content is displayed 1125 instead of the original virtual content thereby overcoming or reducing the impact of overlapped real life objects.

The dashed lines in FIG. 11 indicate that actions that are interconnected with a dotted line may be performed by different operators, at different sites and/or at different times.

The calibration of the image capturing device to the display arrangement (1100-1104) is, in one embodiment, done once at the manufacturing site of the device or during development depending on tolerances in production, where large tolerances may be dealt with in the production line and small tolerances may be dealt with during the development.

The alignment according to a user's eye(s) (1110-1115) may be done once per user or if the user determines that a new alignment is needed, such as if the device is moved on the user's head during or between uses.

The modification of the virtual content (1120-1125) may be done (at least once) for each frame.

The dashed lines are thus not indicating a relation of that all steps have to be performed by the same operator, but rather the order in time that the steps could be taken to provide the best calibration and consequently the best presentation of the virtual content.

Dotted lines are used in FIG. 11 to indicate that the adjustments or calibrations may be repeated.

As indicated by the dotted line connecting 1125 and 1121 through 1126, the modification of the virtual content displayed is, in one embodiment, a repeated process which repetition may end when the difference is negligible, i.e. under a threshold. As indicated above, the threshold may be a subjective threshold in the case where a user determines that the difference is negligible. For the purpose of rendering FIG. 11 in a clear and uncluttered manner, the possibility of a subjective determination will be considered to be included in the threshold determination 1126.

The same principle also applies to the adaptation or calibration of the settings of the image capturing device, where the process may be repeated until it is determined 1105 that the difference is below a threshold. And also for the alignment according to a user's eye(s), where the process may be repeated until the offset is determined 1116 to be under a threshold, where in this instance, the threshold is most likely a subjective threshold.

The teachings herein may be implemented in software, hardware or a combination of software and hardware where some features are implemented in hardware, and some features are implemented in software.

Figure 12:
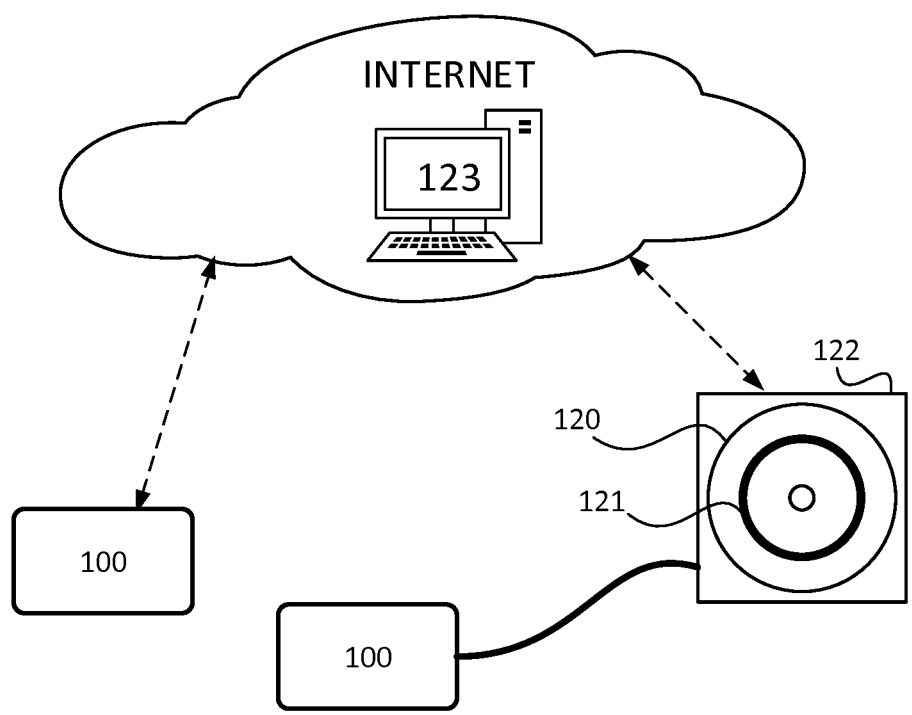
FIG. 12 shows a schematic view of a computer-readable medium carrying computer instructions that when loaded into and executed by a controller of a viewing device enables the viewing device to implement an embodiment of the present invention.

FIG. 12 shows a schematic view of a computer-readable medium 120 carrying computer instructions 121 that when loaded into and executed by a controller of a viewing device 100 enables the viewing device 100 to implement the present invention.

The computer-readable medium 120 may be tangible such as a hard drive or a flash memory, for example a USB memory stick or a cloud server. Alternatively, the computer-readable medium 120 may be intangible such as a signal carrying the computer instructions enabling the computer instructions to be downloaded through a network connection, such as an internet connection.

In the example of FIG. 12, a computer-readable medium 120 is shown as being a computer disc 120 carrying computer-readable computer instructions 121, being inserted in a computer disc reader 122. The computer disc reader 122 may be part of a cloud server 123—or other server—or the computer disc reader may be connected to a cloud server 123—or other server. The cloud server 123 may be part of the internet or at least connected to the internet.

The computer disc reader 122 may also or alternatively be connected to (or possibly inserted into) a viewing device 100 for transferring the computer-readable computer instructions 121 to a controller of the viewing device (presumably via a memory of the viewing device 100).

FIG. 12 shows both the situation when a viewing device 100 receives the computer-readable computer instructions 121 via an internet connection and the situation when another viewing device 100 receives the computer-readable computer instructions 121 through a wired interface. This enables for computer-readable computer instructions 121 being downloaded into a viewing device 100 thereby enabling the viewing device 100 to operate according to and implement the invention as disclosed herein.

Figure 13A:
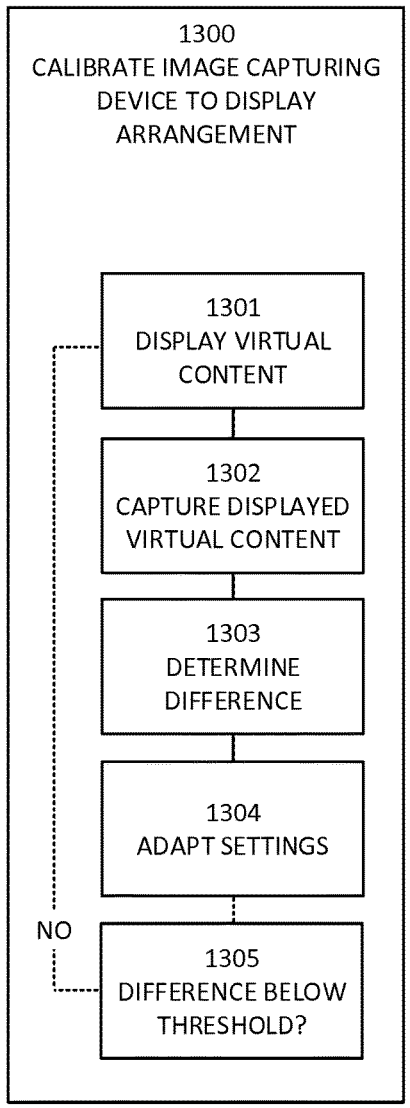
FIG. 13A, FIG. 13B, and FIG. 13C each show a component view for a software component arrangement according to an embodiment.
Figure 13B:
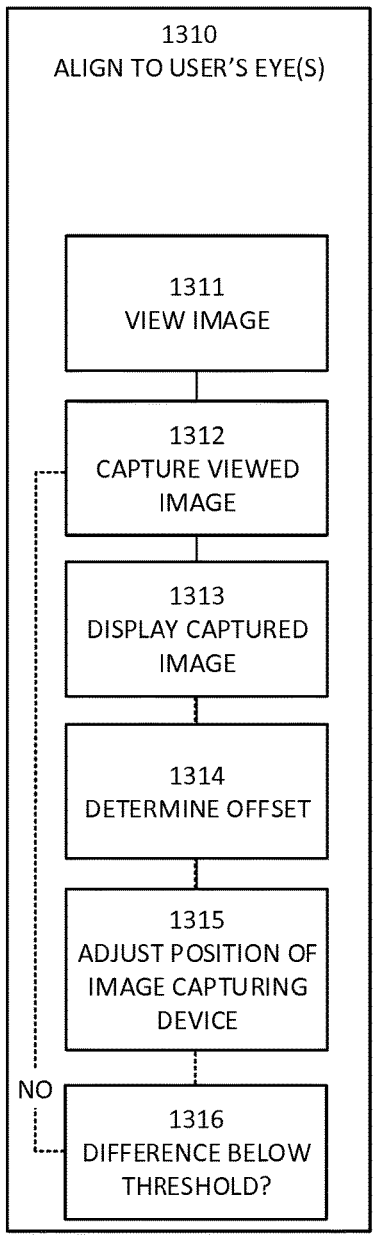
Figure 13C:
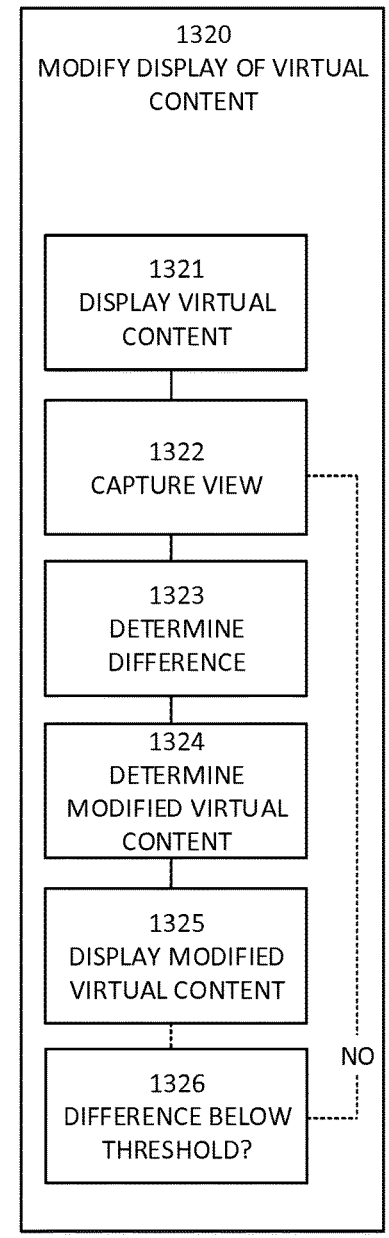

FIGS. 13A, 13B and 13C each shows a component view for a software component arrangement 1300, 1310 and 1320 respectively according to an embodiment of the teachings herein. The software component arrangements 1300, 1310 and 1320 respectively are adapted to be used in a viewing device 100 as taught herein for enhancing the readability of virtual content in the viewing device 100. It should be noted that when implemented or comprised in a viewing device 100, the software component arrangements 1300, 1310, 1320, although being disclosed as three separate arrangement, may in fact be one and the same arrangement.

The software component arrangement 1300 of FIG. 13A comprises software components for calibrating the image capturing device 112 to the display arrangement 110, including a software component for displaying 1301 an image, a software component for capturing 1302 the displayed image with the image capturing device 112 and a software component for determining a difference in center points of the active area of the display arrangement and of the field of view of the image capturing device 112 and a software component for adapting 1304 the settings of the image capturing device 112 by re-cropping and re-centering the field of view of the image capturing device 112 accordingly. The software component for adapting the settings 1304 may also be for adapting color settings based on a comparison between the displayed image and the captured image.

FIG. 13B shows a component view of a software component arrangement 1310 for calibrating the image capturing device 112 according to the user, the software component arrangement 1310 comprising a software component for by aligning 1310 the image capturing device 112 to the user's eye(s) E when viewing 1311 an image through the viewing device 100 or being displayed in the viewing device 100, a software component for capturing 1312 the viewed image and a software component for displaying 1313 the captured image, whereby an offset between the viewed image and the captured image is determined by a software component for determining an offset 1314 and the position of the image capturing device 112 is adjusted by a software component for adjusting 1315 accordingly.

FIG. 13C shows a component view of a software component arrangement 1320 for utilizing the image capturing device 112 to modify how virtual content is displayed so that overlapped real world objects may be filtered out, or at least the impact of such overlapped real life objects is reduced. The modification of the virtual content software component arrangement 1320 comprises a software component for displaying 1321 the virtual content and a software component for capturing 1322 a view including the virtual content. The software component arrangement 1320 further comprises a software component for, based on the captured view of the virtual content, determining 1323 a difference, a software component for, based on the difference, determining 1324 how the virtual content should be modified to accommodate for the difference by and a software component for displaying 1325 the modified virtual content instead of the original virtual content thereby overcoming or reducing the impact of overlapped real life objects.

The calibration of the image capturing device to the display arrangement (component arrangement 1300) is, in one embodiment, executed once at the manufacturing site of the device or during development depending on tolerances in production, where large tolerances may be dealt with in the production line and small tolerances may be dealt with during the development.

The alignment according to a user's eye(s) (component arrangement 1310) may be executed once per user or if the user determines that a new alignment is needed, such as if the device is moved on the user's head during or between uses.

The modification of the virtual content (component arrangement 1320) may be executed (at least once) for each frame.

Dotted lines are used in FIG. 13 to indicate that the adjustments or calibrations may be repeated through alternative repetition software components 1305, 1316, 1326.

As indicated by the dotted line connecting software component 1325 and software component 1321 through software component 1326, the modification of the virtual content displayed is, in one embodiment, a repeated process which repetition is repeated until it is determined by software component 1326 that the difference is negligible, i.e. under a threshold. As indicated above, the threshold may be a subjective threshold in the case where a user determines that the difference is negligible. For the purpose of rendering FIG. 13C in a clear and uncluttered manner, the possibility of a subjective determination will be considered to be included in the threshold determination 1326.

The same principle also applies to the adaptation or calibration of the settings of the image capturing device, where the process may be repeated until it is determined by software component 1305 that the difference is below a threshold.

And also for the alignment according to a user's eye(s), where the process may be repeated until the offset is determined by software component 1316 to be under a threshold, where in this instance, the threshold is most likely a subjective threshold.

For software components for determining that a subjective threshold has been reached, the software component is for receiving user input to that effect.

The invention claimed is:

1. An optical see-through viewing device comprising a controller configured to control a display arrangement comprising an image capturing device, wherein the controller is further configured to:
   a) display virtual content overlapping at least one real-life object viewable by a user's eye through the optical see-through viewing device;
   b) capture a composite view of displayed virtual content overlapping the at least one real-life object, using the image capturing device;
   c) determine captured virtual content based on the captured composite view;
   d) determine a difference between the captured virtual content and the displayed virtual content;
   e) determine modified virtual content based on the difference; and
   f) display the modified virtual content.

2. The optical see-through viewing device of claim 1, wherein the controller is further configured to repeat a) to f) until the difference is below a threshold.

3. The optical see-through viewing device of claim 1, wherein the controller is further configured to determine the modified virtual content by determining the color complement of the difference.

4. The optical see-through viewing device of claim 1, wherein the controller is further configured to determine the modified virtual content by adapting the illumination of the displaying of the virtual content.

5. The optical see-through viewing device of claim 1, wherein the controller is further configured to determine the difference by a pixel-wise subtraction.

6. The optical see-through viewing device of claim 5, wherein the controller is further configured to determine the difference by transforming the captured virtual content and the displayed virtual content from a first color space into a second color space, determine the difference in the second color space, and then perform a transformation back to the first color space.

7. An optical see-through viewing device comprising a controller configured to control a display arrangement comprising an image capturing device, wherein the controller is further configured to calibrate the image capturing device to the display arrangement by: displaying virtual content; capturing the displayed virtual content; determining a center point of the displayed virtual content; determining a center point of the captured virtual content; and adapting a field of view of the image capturing device, based on the center points determined from the displayed virtual content and the captured virtual content.

8. The optical see-through viewing device of claim 7, wherein the controller is further configured to calibrate the image capturing device to the display arrangement by:
- determining a further difference between the displayed virtual content and the captured virtual content; and
- adapting settings according to the difference between the displayed virtual content and the captured virtual content.

9. An optical see-through viewing device comprising a controller configured to control a display arrangement comprising an image capturing device, wherein the controller is further configured to align the image capturing device to the user's eye by:
- displaying virtual content;
- capturing the displayed virtual content, using the image capturing device;
- displaying the captured virtual content; and
- adapting the image capturing device according to a spatial difference between the captured virtual content and the displayed virtual content.

10. The optical see-through viewing device of claim 9, wherein the controller is further configured to align the image capturing device to the user's eye by:
- capturing a view of a real life object;
- displaying the captured real life object;
- adapting the image capturing device according to a spatial difference between the captured real life object and the real life object.

11. The optical see-through viewing device of claim 9, wherein the image capturing device further comprises an image capturing device moving arrangement, wherein the controller is further configured to adapt the image capturing device according to the spatial difference by causing the image capturing device to be moved.

12. The optical see-through viewing device of claim 9, wherein the image capturing device further comprises a user interface and the controller is further configured to
- receive user input through said user interface, and
- adapt the image capturing device by moving the image capturing device according to the received user input.

13. The optical see-through viewing device of claim 9, wherein the image capturing device further comprises a user interface and the controller is further configured to adapt the image capturing device by moving the image capturing device in at least one of two directions.

14. The optical see-through viewing device of claim 9, wherein the image capturing device further comprises a user interface and the controller is further configured to adapt the image capturing device by moving the image capturing device in at least one of three directions.

15. The optical see-through viewing device of claim 9, wherein the image capturing device further comprises a user interface and the controller is further configured to adapt the image capturing device by moving the image capturing device in an angular direction.

16. The optical see-through viewing device of claim 9, wherein the display arrangement comprises a projector and a transparent mirror wherein the image capturing device is arranged within an at least virtual line of sight of the user.

17. The optical see-through viewing device of claim 16, wherein the image capturing device is configured to be arranged adjacent to a location of the user's eye when using the viewing device.

18. The optical see-through viewing device of claim 16, wherein the image capturing device is arranged adjacent to the projector.

19. The optical see-through viewing device of claim 16, wherein the image capturing device is arranged on an opposite side of the transparent mirror to the projector.

20. A method for enhancing the readability of virtual content in an optical see-through viewing device comprising a controller configured to control a display arrangement comprising an image capturing device, wherein the method comprises:
- a) displaying virtual content overlapping at least one real-life object viewable by a user's eye through the optical see-through viewing device;
- b) capturing a composite view of displayed virtual content overlapping the at least one real-life object, using the image capturing device;
- c) determining captured virtual content based on the captured composite view;
- d) determining a difference between the captured virtual content and the displayed virtual content;
- e) determining modified virtual content based on the difference; and
- f) displaying the modified virtual content.

* * * * *

UNITED STATES PATENT AND TRADEMARK OFFICE
CERTIFICATE OF CORRECTION

PATENT NO. : 11,749,142 B2
APPLICATION NO. : 17/299014
DATED : September 5, 2023
INVENTOR(S) : Hunt et al.

It is certified that error appears in the above-identified patent and that said Letters Patent is hereby corrected as shown below:

On the Title Page

On Page 2, item (56), under "OTHER PUBLICATIONS", in Column 2, Line 1, delete "Langloiz," and insert -- Langlotz, --, therefor.

In the Specification

In Column 1, Lines 24-25, delete "Pokemon" and insert -- Pokémon --, therefor.

In Column 1, Line 30, delete "Pokemon" and insert -- Pokémon --, therefor.

In Column 1, Line 58, delete "see through" and insert -- see-through --, therefor.

In Column 1, Line 62, delete "1013" and insert -- 10B --, therefor.

In Column 4, Line 11, delete "could the" and insert -- could --, therefor.

In Column 6, Line 7, delete "4 a" and insert -- 4 shows a --, therefor.

In Column 6, Line 53, delete "eye wear" and insert -- eyewear --, therefor.

In Column 7, Line 1, delete "Cristal" and insert -- Crystal --, therefor.

In Column 7, Line 17, delete "be the" and insert -- be --, therefor.

In Column 8, Line 48, delete "IDeintifier)" and insert -- Identification) --, therefor.

In Column 8, Line 51, delete "supplemental" and insert -- supplemental of --, therefor.

Signed and Sealed this
Sixteenth Day of July, 2024

Katherine Kelly Vidal
*Director of the United States Patent and Trademark Office*

In Column 8, Line 55, delete "(Global Systéme Mobilé)" and insert -- (Global System for Mobile Communication) --, therefor.

In Column 8, Line 59, delete "Plug n" and insert -- Plug and --, therefor.

In Column 8, Line 61, delete "Appliance)" and insert -- Alliance) --, therefor.

In Column 9, Line 20, delete "Cristal" and insert -- Crystal --, therefor.

In Column 9, Line 30, delete "relative" and insert -- relative to --, therefor.

In Column 9, Line 31, delete "relative" and insert -- relative to --, therefor.

In Column 9, Line 49, delete "user's sees." and insert -- user sees. --, therefor.

In Column 9, Line 59, delete "indicting" and insert -- indicating --, therefor.

In Column 10, Line 30, delete "such an" and insert -- such --, therefor.

In Column 10, Line 48, delete "shows" and insert -- show --, therefor.

In Column 10, Line 61, delete "shows" and insert -- show --, therefor.

In Column 11, Line 11, delete "blacK)" and insert -- black) --, therefor.

In Column 11, Line 31, delete "need be" and insert -- needs to be --, therefor.

In Column 11, Line 47, delete "aspects saturation and hue are adapted" and insert -- aspects of saturation and hue --, therefor.

In Column 13, Line 30, delete "offset" and insert -- offset by --, therefor.

In Column 13, Line 40, delete "mage" and insert -- image --, therefor.

In Column 13, Line 51, delete "in the above" and insert -- above --, therefor.

In Column 13, Line 67, delete "GregTag" and insert -- GreTag --, therefor.

In Columns 13 & 14, Lines 67 & 1-6, delete "In.....................an below." and insert the same at Column 14, Line 1, as a new paragraph.

In Column 14, Line 32, delete "GregTag" and insert -- GreTag --, therefor.

In Column 14, Line 46, delete "devices" and insert -- devices' --, therefor.

In Column 14, Line 63, delete "and 11" and insert -- and 11. --, therefor.

CERTIFICATE OF CORRECTION (continued)
U.S. Pat. No. 11,749,142 B2

In Column 17, Line 24, delete "for by" and insert -- for --, therefor.

In the Claims

In Column 19, Lines 24-25, in Claim 9, delete "the user's eye" and insert -- a user's eye --, therefor.

In Column 19, Line 49, in Claim 12, delete "configured to" and insert -- configured to: --, therefor.

In Column 19, Line 50, in Claim 12, delete "interface, and" and insert -- interface and --, therefor.